(12) United States Patent
Huang et al.

(10) Patent No.: US 10,933,380 B2
(45) Date of Patent: Mar. 2, 2021

(54) METHOD AND DEVICE FOR MANUFACTURING A HOLLOW FIBER MEMBRANE MODULE

(71) Applicant: Dongguan University of Technology, Dongguan (CN)

(72) Inventors: Simin Huang, Dongguan (CN); Kui He, Dongguan (CN)

(73) Assignee: Dongguan University of Technology, Dongguan (CN)

( * ) Notice: Subject to any disclaimer, the term of this patent is extended or adjusted under 35 U.S.C. 154(b) by 144 days.

(21) Appl. No.: 16/027,179

(22) Filed: Jul. 3, 2018

(65) Prior Publication Data

US 2019/0168171 A1    Jun. 6, 2019

(30) Foreign Application Priority Data

Dec. 5, 2017 (CN) .......................... 2017 1 1269631

(51) Int. Cl.
*B01D 69/08* (2006.01)
*B01D 63/02* (2006.01)
*B01D 69/10* (2006.01)

(52) U.S. Cl.
CPC .......... *B01D 69/08* (2013.01); *B01D 63/022* (2013.01); *B01D 63/023* (2013.01); *B01D 69/10* (2013.01); *B01D 2313/06* (2013.01); *B01D 2323/42* (2013.01)

(58) Field of Classification Search
CPC .... B01D 69/08; B01D 63/022; B01D 63/023; B01D 69/10; B01D 2323/42; B01D 2313/06; B01D 63/02; B01D 63/021
See application file for complete search history.

(56) References Cited

FOREIGN PATENT DOCUMENTS

JP    3385668 B2 *  3/2003

\* cited by examiner

*Primary Examiner* — Waqaas Ali
(74) *Attorney, Agent, or Firm* — JCIPRNET

(57) ABSTRACT

The invention provides a method and a device for manufacturing a hollow fiber membrane module. The present invention, by penetrating the hollow fiber membrane wires into the steel wires and performing rigidization treatment, greatly improves the rigidity of the hollow fiber membrane wire module, thereby avoiding the bending and deformation of or the damage of hollow fiber membrane wire module due to a small force during the production process, which greatly improves the production efficiency of the hollow fiber membrane module. The device of the present invention is used to achieve the above-mentioned method.

5 Claims, 6 Drawing Sheets

METHOD AND DEVICE FOR MANUFACTURING A HOLLOW FIBER MEMBRANE MODULE

TECHNICAL FIELD

The invention belongs to the technical field of processing of a membrane module, and in particular, to a method and a device for manufacturing a hollow fiber membrane module.

BACKGROUND

Membrane separation technology is widely used in seawater desalination, water treatment, biomedical treatment, and many other modern industrial technical fields. Membrane modules are key components in various membrane separation industries, and their processing technology and related equipment have important economic value. The technology in which an organic membrane is used as a main component of a membrane module accounts for about 50%. Organic membranes have the outstanding advantages of corrosion resistance and low cost. However, at present, the defects mainly existed in processing technology of the components of organic hollow are that the processing technology cannot be mechanized, and that the consistency of the performance of the processed components is poor, etc. The quality and performance of the membrane module are not limited by the performance of the membrane itself only. The performance of the membrane module is also greatly influenced by the problems such as the uneven distribution of the membrane tubes during the processing of the membrane module, the damage of the membrane tubes during the potting and encapsulating process and so on. According to the test of the membrane module, uneven distribution of the membrane wire has a great influence on the overall performance of the module. In some cases, it will cause the performance of the module to be reduced by more than 50%. With the increasing use of membrane separation technology, higher demands are placed on the automation of membrane module processing and the quality of the components themselves.

One important reason why membrane modules are difficult to be processed automatically is that hollow fiber membranes made from organic materials are not as rigid as ceramic membranes. The membranes bend and deform under a small force. Therefore, the development of an automated technology and a device that can produce hollow fiber membrane modules which are arranged regularly has become an urgent need in the field of the application of the membrane separation technology.

SUMMARY OF THE INVENTION

In order to solve the above-mentioned problems in the prior art, the present invention provides a method and a device for manufacturing a hollow fiber membrane module, which are used for automated production of regularly arranged hollow fiber membrane modules, and have advantages such as a high quality of the finished product, a simple procedure and a low consumption of materials.

To achieve the above-mentioned objectives, the present invention adopts the following technical solutions:

A method for manufacturing a hollow fiber membrane module, comprises the following steps:

S10: penetrating steel wires having a length greater than that of hollow fiber membrane wire segments into the hollow fiber membrane wire segments along the length direction of the hollow fiber membrane wire segments, and performing relatively fixing treatment to the steel wires and the hollow fiber membrane wire segments;

S20: orderly filling a plurality of hollow fiber membrane wire segments fixed with steel wires into accommodating grooves of a hollow fiber membrane module holder.

S30: using a casing to wrap around the hollow fiber membrane module holder, and encapsulating the casing with a sealant; and S40: releasing the relative fixation between the steel wires and the hollow fiber membrane wire segments after the sealant is dried, and then removing the steel wires from the hollow fiber membrane wire segments.

Further, the method further comprises a step S01 before the step S10: cutting and screening membrane wires: cutting and screening out the hollow fiber membrane wires with a desired diameter and/or length.

Further, the method uses a molten paraffin to block two ports of the hollow fiber membrane wire segments and leaves the molten paraffin to be solidified, so as to fix the steel wires and the hollow fiber membrane wire segments.

Further, the method for removing the steel wires from the hollow fiber membrane wire segments in the step S40 is: using a centrifuge to flick the steel wires out of the hollow fiber membrane wire segments.

The invention further discloses a device for manufacturing a hollow fiber membrane module, which comprises:

a rigidization treatment module, used for penetrating steel wires having a length larger than that of hollow fiber membrane wires into hollow fiber membrane wire segments and relatively fixing the steel wires and the hollow fiber membrane wire segments such that the hollow fiber membrane wire segments are rigidized;

a membrane wire filling module, used for orderly filling the hollow fiber membrane wire segments to which rigidization treatment have been performed into accommodating grooves in a hollow fiber membrane module holder; and a potting and encapsulating module, used for mounting the hollow fiber membrane module holder filled with the hollow fiber membrane wire segments into a casing of the hollow fiber membrane module, and potting and encapsulating the casing.

Further, the rigidization treatment module comprises a three-axis motion platform, a membrane wire transporting and fixing mechanism which is mounted on the three-axis motion platform, a steel wire gripping mechanism, a head mechanism, and a position identification system which is connected with a motion control circuit of the three-axis motion platform. The position identification system comprises one or more sensing terminals, and the one or more sensing terminals are mounted on the membrane wire transporting and fixing mechanism, the steel wire gripping mechanism and/or the head mechanism.

The membrane wire transporting and fixing mechanism is used for transporting and fixing the hollow fiber membrane wires.

The steel wire gripping mechanism is used for griping and fixing the steel wires.

The head mechanism is provided with a paraffin mold cavity and a wax injection tube which are communicated with each other. The wax injection tube is used for injecting molten paraffin into the paraffin mold cavity, and the paraffin mold cavity is used for covering two ports of the hollow fiber membrane wire segments, so as to use the cooling and solidification process of the paraffin to relatively fix the hollow fiber membrane wires and steel wires.

The position identification system is used for sensing the relative location of the membrane wire transporting and fixing mechanism, of the steel wire gripping mechanism and of the head mechanism in a three-dimensional space.

The three-axis motion platform is used in combination with the position identification system, for aligning the steel wires on a threading robot with the hollow fiber membrane wire segments on the membrane wire transporting and fixing mechanism, and penetrating the steel wires into the hollow fiber membrane wire segments, and the three-axis motion platform is also used in combination with the position identification system, for moving the paraffin mold cavity of the head mechanism to the two ports of the hollow fiber membrane wire segments.

Further, the steel wire gripping mechanism and the head mechanism are integrally provided on one threading robot. The threading robot comprises an opening and closing control mechanism, and two mold sections mounted on the opening and closing control mechanism. A semi-cylindrical gripping groove body and a semi-cylindrical mold cavity groove body are provided at the middle of mold sections. The gripping groove body and the mold cavity groove body are coaxially arranged and communicated with each other. A diameter of the gripping groove body is matched with a diameter of the steel wires, and a diameter of the mold cavity groove body is larger than that of the gripping groove body. The opening and closing control mechanism is used for controlling the two mold sections to mutually close or open, wherein the Dipping groove bodies of the two mold sections jointly form a gripping portion for gripping and fixing the steel wires, such that the function of the steel wire gripping mechanism is achieved by the threading robot. The mold cavity groove bodies of the two mold sections jointly form the paraffin mold cavity when the two mold sections are closed, and a wax injection tube is provided in one of the mold sections such that the function of the head mechanism is achieved by the threading robot.

Further, the membrane wire transporting and fixing mechanism comprises:

a storage hopper, used for storing the hollow fiber membrane wires, and a cross section of the storage hopper being in the form of a cone of which an upper part is larger and a lower part is small, and its bottom being provided with an opening;

a transporting groove connected to a lower side of the storage hopper for receiving the hollow fiber membrane wires dropped from the storage hopper; both ends of the bottom of the transporting groove are provided with openings for exposing cross sections of the hollow fiber membrane wires dropped at the bottom of the transporting groove, and for the penetration of the steel wires into the hollow fiber membrane wires; the bottom of the transporting groove being provided with a notch and a cover plate which is electrically controlled to open and close, and the width of the transporting groove being matched with the diameter of the hollow fiber membrane wires, such that only one hollow fiber membrane wire is allowed to be dropped from the notch when the cover plate opens; and a blowing mechanism connected to an upper middle portion of the transporting groove for blowing air into the transporting groove, such that the hollow fiber membrane wires in the transporting groove are closely fixed on the bottom of the transporting groove using air pressure.

Further, the device further comprises a steel wire removal module for heating the solidified paraffin at both ends of the hollow fiber membrane wires so as to release the relative fixing relationship between the steel wires and the hollow fiber membrane wires, and to remove the steel wires from the hollow fiber membrane wires.

Further, the membrane wire filling module comprises:

a plurality of holes provided on the hollow fiber membrane module holder and used for the insertion of the hollow fiber membrane wires;

an insertion robot used for inserting the hollow fiber membrane wires into the holes of the hollow fiber membrane module holder; and a fixing mechanism used for fixing the hollow fiber membrane module holder when the insertion robot is working.

The invention further discloses a hollow fiber membrane module, which is manufactured in the above-mentioned device for manufacturing a hollow fiber membrane module using the above-mentioned manufacturing method. The hollow fiber membrane module comprises a casing, a plurality of hollow fiber membrane wire segments, a sealant and a hollow fiber membrane module holder. The hollow fiber membrane module holder is provided with a plurality of accommodating grooves for accommodating the hollow fiber membrane wire segments, and the plurality of accommodating grooves are regularly arranged and evenly distributed in the hollow fiber membrane module holder.

Compared with the prior art, the advantages of the present invention are as follows:

The present invention, by using a rigidization treatment module to penetrate the hollow fiber membrane wires into the steel wires during the production process, greatly improves the rigidity of the hollow fiber membrane wires, thereby avoiding the bending and deformation of or the damage of hollow fiber membrane wires due to a small force during the production process; and by providing the hollow fiber membrane module with a plurality of accommodating grooves for accommodating the hollow fiber membrane wire segments, the accommodating grooves being regularly arranged and evenly distributed in the hollow fiber membrane module holder, the hollow fiber membrane wire produced are regularly arranged and evenly distributed, which greatly improves the production efficiency of the hollow fiber membrane module. The manufacturing device provided by the invention is used for achieving the above method and are capable of automatic production. There is less manual intervention in the whole production process, and the equipment can accurately control the production process of the membrane module. The method is simple, and the used consumables are less. The method can be applied to the manufacturing and processing of various membrane separation modules.

REFERENCE SIGNS

1—laser cutting mechanism, 2—fixing buckle, 3—vibrating mechanism, 4—belt conveying mechanism, 5—conical screen, 6—storage hopper, 7—transporting groove, 8—blowing mechanism, 9—threading robot, 90—opening and closing control mechanism, 91—mold section, 92—gripping groove body, 93—mold cavity groove body, 94—wax injection tube, 10—sensing terminal, 11—hollow fiber membrane module holder, 12—fixing mechanism, 13—glue mixer, 14—peristaltic pump, 15—centrifuge, 16—delivery tube, 801—rigidization treatment module, 802—membrane wire filling module, 803—potting and encapsulating module, 804—three-axis motion platform, 805—position identification system, 806—steel wire gripping mechanism, 807—membrane wire transporting and fixing mechanism, 811—steel wire removal module, 812—insertion robot.

DETAILED DESCRIPTION OF THE PREFERRED EMBODIMENT

The technical solutions of the present invention are further described below with reference to the accompanying drawings and specific embodiments. It should be understood that these embodiments are only for explaining the present invention and are not used for limiting the scope of the present invention.

Embodiment 1

A device for manufacturing a hollow fiber membrane module provided in the present embodiment comprises a cutting and screening module, a rigidization treatment module, a membrane wire filling module, a potting and encapsulating module, and a steel wire removal module.

The cutting and screening module is used for cutting and screening out hollow fiber membrane wires with a desired diameter and length.

The rigidization treatment module is used for penetrating steel wires having a length greater than that of hollow fiber membrane wires into the hollow fiber membrane wires, and relatively fixing the steel wires and the hollow fiber membrane wires such that the hollow fiber membrane wires are rigidized.

The membrane wire filling module is used for filling the hollow fiber membrane wires to which rigidization treatment have been performed into the hollow fiber membrane module holder.

The potting and encapsulating module is used for mounting the hollow fiber membrane module filled with hollow fiber membrane wires into a hollow fiber membrane module casing, and potting and encapsulating the casing.

The steel wire removal module is used for to release the relative fixing relationship between the steel wires and the hollow fiber membrane wires, and removing the steel wires from the hollow fiber membrane wires, after the sealant is dried.

Figure 1:
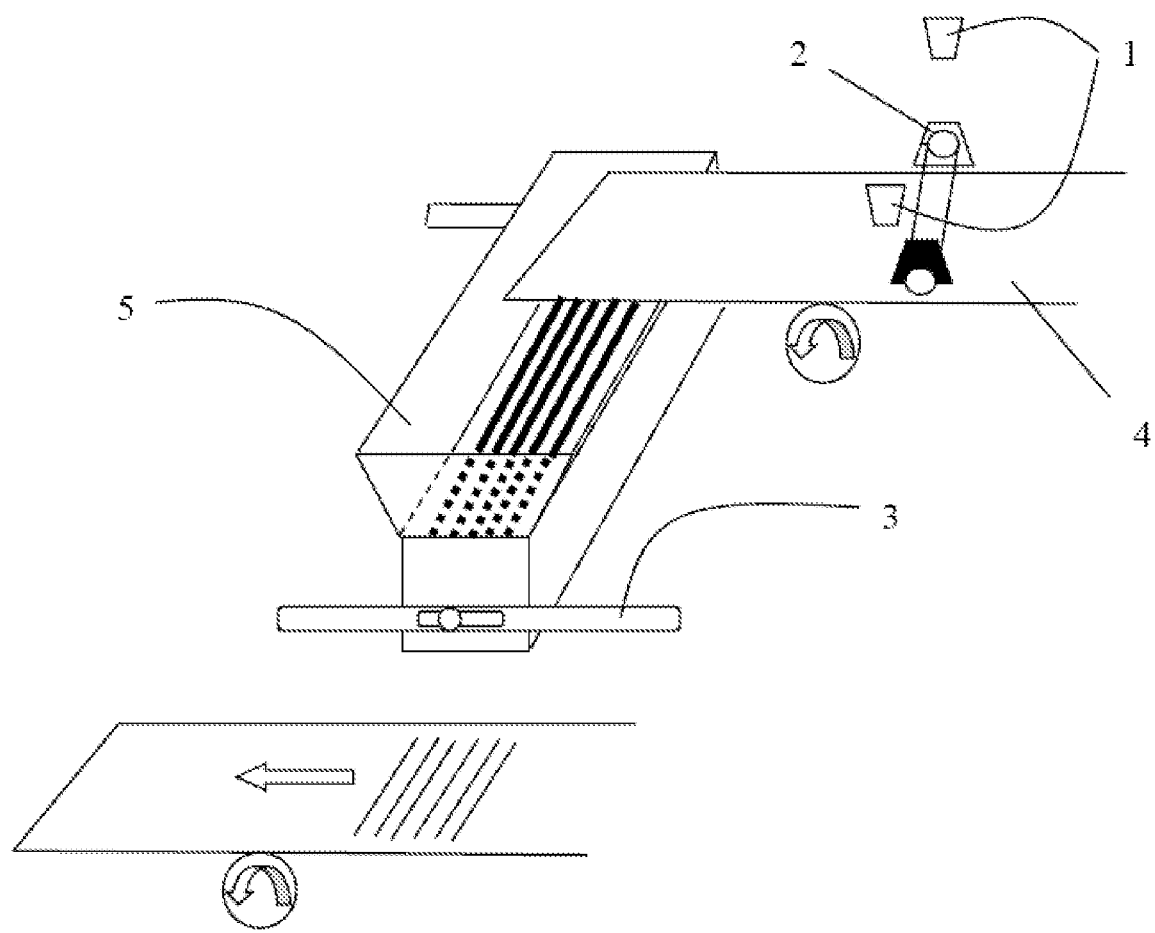
FIG. 1 is a schematic structural view of a cutting and screening module in embodiment 1.

Specifically, as shown in FIG. 1, the cutting and screening module comprises a conical screen 5, a vibrating mechanism 3, a belt conveying mechanism 4, and a laser cutting mechanism 1.

The belt conveying mechanism 4 is used for conveying the hollow fiber membrane wires to be screened, wherein the hollow fiber membrane wires are provided on the belt conveying mechanism 4 in a posture perpendicular to the conveying direction.

The laser cutting mechanism 1 is provided on both sides of the belt conveying mechanism 4 for performing laser cutting to the hollow fiber membrane wires according to the width of the belt transport mechanism 4.

The conical screen 5 is provided at the end of the belt conveying mechanism 4 in the conveying direction, and the conical screen 5 is provided with screen holes of a specific diameter.

The vibrating mechanism 3 is mounted on the conical screen 5 for vibrating the conical screen 5 so as to screen out the hollow fiber membrane wires having a diameter that meets the requirements.

As an improvement, the belt conveying mechanism 4 is further provided with a fixing buckle 2 for fixing the hollow fiber membrane wires, and the fixing buckle 2 is automatically released after the hollow fiber membrane wires cutting is completed.

As an improvement, there is a plurality of cutting and screening modules, and the plurality of cutting and screening modules can achieve multi-stage cutting and screening of hollow fiber membrane wires of different lengths and different diameters.

Further, the rigidization treatment module 801 comprises a three-axis motion platform 804, a membrane wire transporting and fixing mechanism 807 which is mounted on the three-axis motion platform 804, a steel wire gripping mechanism 806, a head mechanism, and a position identification system 805 which is connected with a motion control circuit of the three-axis motion platform 804. The position identification system 805 comprises one or more sensing terminals, and the one or more sensing terminals are mounted on the membrane wire transporting and fixing mechanism 807, the steel wire gripping mechanism 806 and/or the head mechanism.

The membrane wire transporting and fixing mechanism 807 is used for transporting and fixing the hollow fiber membrane wires.

The steel wire gripping mechanism 806 is used for griping and fixing the steel wires. In the present embodiment, the steel wires used are a tungsten steel, which has a relatively large rigidity, and the length of the steel wires is 130%-150% of the length of the hollow fiber membrane wires.

The head mechanism is provided with a paraffin mold cavity and a wax injection tube which are communicated with each other. The wax injection tube is used for injecting molten paraffin into the paraffin mold cavity, and the paraffin mold cavity is used for covering on a location at which the steel wires are exposed at both ends of the hollow fiber membrane wires, so as to use the cooling and solidification process of the paraffin to relatively fix the hollow fiber membrane wires and steel wires.

The position identification system 805 is used for sensing the relative location of the membrane wire transporting and fixing mechanism 807, of the steel wire gripping mechanism 806 and of the head mechanism in a three-dimensional space.

The three-axis motion platform 804 is used in combination with the position identification system 805 for aligning the steel wires on a threading robot 9 with the hollow fiber membrane wires on the membrane wire transporting and fixing mechanism 807, and penetrating the steel wires into the hollow fiber membrane wires, and the three-axis motion platform 804 is also used in combination with the position identification system 805 for moving the paraffin mold cavity of the head mechanism to a location at which the steel wires are exposed at both ends of the hollow fiber membrane wires.

Figure 2:
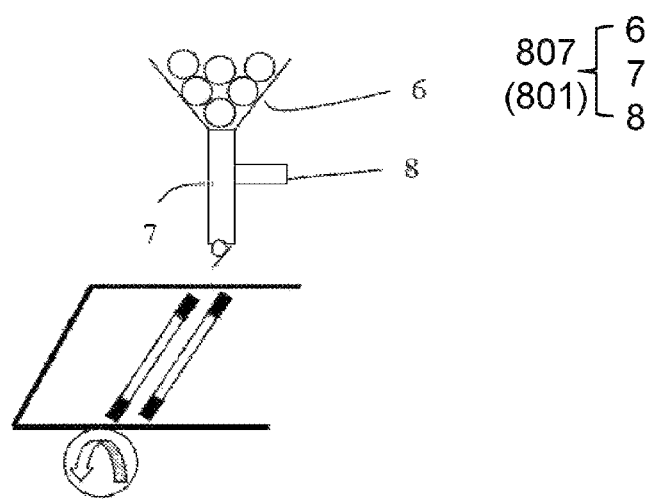
FIG. 2 is a schematic structural view of a membrane wire transporting and fixing mechanism in embodiment 1.

Specifically, as shown in FIG. 2, the membrane wire transporting and fixing mechanism 807 comprises a storage hopper 6, a transporting groove 7, and a blowing mechanism 8.

The storage hopper 6 is used for accumulating and storing the hollow fiber membrane wires. A cross section of the storage hopper 6 is in the form of a cone of which an upper part is lager and a lower part is small, and its bottom is provided with an opening.

The transporting groove 7 is connected to a lower side of the storage hopper 6 for receiving the hollow fiber membrane wires dropped from the storage hopper 6. Both ends of the bottom of the transporting groove 7 are provided with openings for exposing cross sections of the hollow fiber membrane wires dropped at the bottom of the transporting groove, and for the penetration of the steel wires into the hollow fiber membrane wires. The bottom of the transporting groove 7 is provided with a notch. A cover plate which is electrically controlled to open and close is mounted at the notch, and the width of the transporting groove 7 is matched with the diameter of the hollow fiber membrane wire such that only one hollow fiber membrane wire is allowed to be dropped from the notch when the cover plate opens.

The air blowing mechanism 8 is connected to an upper middle portion of the transporting groove 7, for blowing air into the transporting groove 7, such that the hollow fiber membrane wires in the transporting groove 7 are closely fixed on the bottom of the transporting groove 7 using air pressure.

Figure 3:
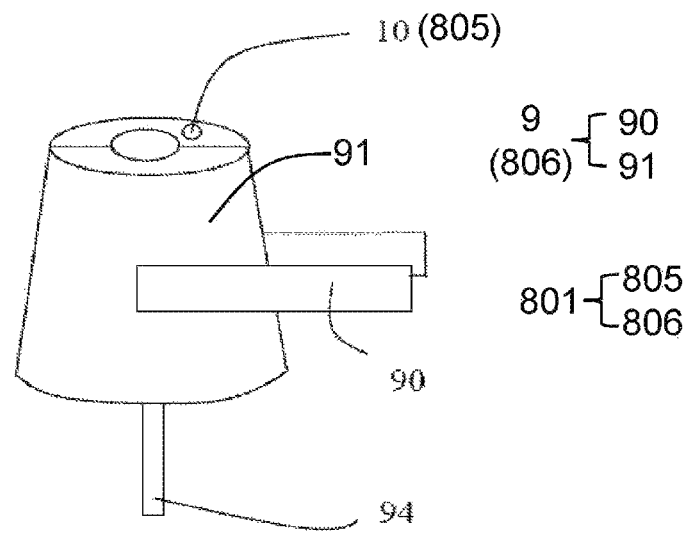
FIG. 3 is a schematic structural view of a threading robot in embodiment 1.
Figure 4:
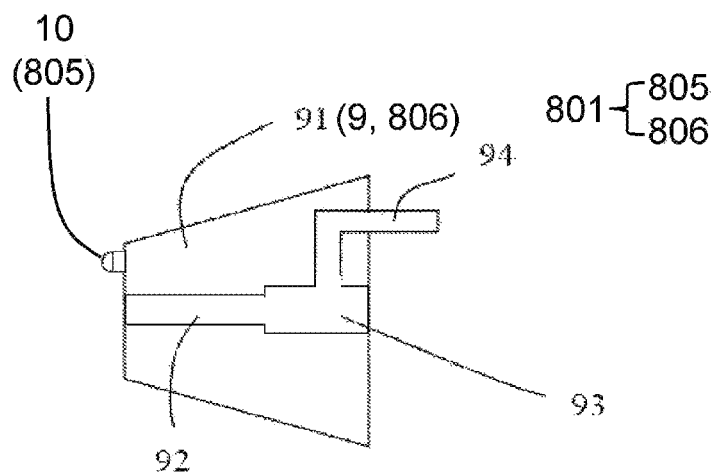
FIG. 4 is a schematic structural view of one of mold sections of the threading robot in embodiment 1.

As shown in FIG. 3 and FIG. 4, in the present embodiment, the steel wire gripping mechanism 806 and the head mechanism are integrally provided on one threading robot 9. The threading robot 9 comprises an opening and closing control mechanism 90 and two mold sections 91 mounted on the opening and closing control mechanism 90. A semi-cylindrical gripping groove body 92 and a semi-cylindrical mold cavity groove body 93 are provided at the middle of mold sections 91. The gripping groove body 92 and the mold cavity groove body 93 are coaxially arranged and communicated with each other. A diameter of the gripping groove body 92 is matched with a diameter of the steel wires, and a diameter of the mold cavity groove body 93 is larger than that of the gripping groove body 92. Specifically, in the present embodiment, the diameter of the gripping groove body 92 is 0.8 mm-1 mm, and the diameter of the mold cavity groove body 93 is 1.2 mm-1.5 mm.

The opening and closing control mechanism 90 may specifically be a rotation opening and closing mechanism driven by a gear set, or may also be a translation opening and closing mechanism driven by a translation mechanism. According to the prior art, there may be a plurality of implementation methods, so it is drawn using schematically omitted drawing method in the drawing. Its essential function is to control the two mold sections to mutually close or open.

In the threading robot 9, the gripping grooves bodies 92 of the two mold sections 91 jointly form a gripping portion for gripping and fixing the steel wires, such that the function of the steel wire gripping mechanism 806 is achieved by the threading robot 9. The mold cavity groove bodies 93 of the two mold sections 91 jointly form the paraffin mold cavity when the two mold sections are closed, and a wax injection tube 94 is provided in one of the mold sections 91 such that the function of the head mechanism is achieved by the threading robot 9. As an improvement, the sensing terminal 10 in the position identification system 805 may also be provided on the threading robot 9, such that the threading robot 9 simultaneously integrates functions of gripping steel wires, wax injection and sealing head, and position identification, which greatly simplifies the structure of the rigidization treatment module 801.

Figure 5:
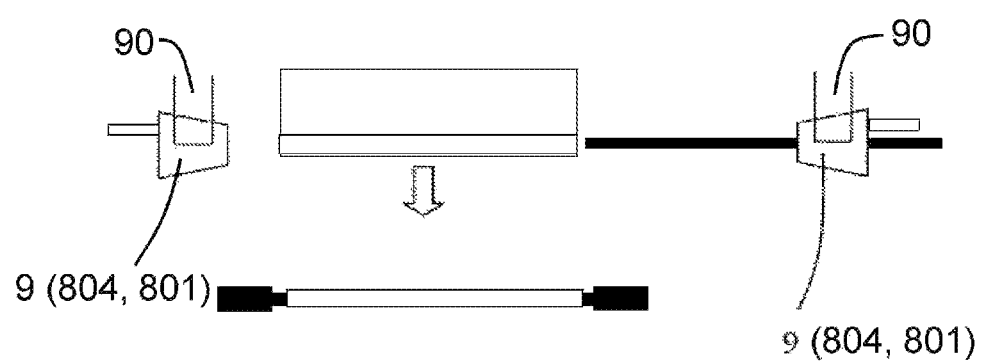
FIG. 5 is a schematic structural view of working process of a rigidization treatment module in embodiment 1.

As shown in FIG. 5, when the rigidization treatment module 801 is working, the blowing mechanism 8 on the membrane wire transporting and fixing mechanism 807 blows air into the transporting groove 7 to compact hollow fiber membrane wires at the bottom after the threading robot 9 uses the gripping groove bodies 92 on the two mold sections 91 to grip the steel wires on a steel wire storage rack. Then, the three-axis motion platform 804 uses the position identification system 805 to align the steel wires with the hollow fiber membrane wires at the bottom of the transporting groove 7, and then pushes the steel wires into the hollow fiber membrane wires. After the steel wire is penetrated through the hollow fiber membrane wire, one threading robot 9 moves the mold cavity body 93 to one end of the hollow fiber membrane wire, and the other threading robot 9 moves the mold cavity body 93 to the other end of the hollow fiber membrane wire. After both ends are fixed by the threading robots 9, the molten paraffin is begun to be injected into the paraffin mold cavity via the wax injection tube 94. After the paraffin is cooled and solidified, the threading robot 9 opens to release the hollow fiber membrane wires therein. Then, the cover plate at the bottom of the transporting groove 7 opens, and the hollow fiber membranes to which rigidization treatment have been performed are released to enter the next process step. At the same time, the threading robots 9 return to the initial position and repeat the above action until all the hollow fiber membranes have been treated.

As an improvement, a vibrating device may further be mounted on the membrane wire transporting and fixing mechanism 807. When the cover plate closes, the vibrating device is turned on to vibrate the membrane wire transporting and fixing mechanism 807, such that the hollow fiber membrane wires in the storage hopper 6 can be smoothly dropped to the transporting groove 7. When the transporting groove 7 is half filled with the hollow fiber membrane wires, the vibration device is turned off to stop the storage hopper 6 from vibrating.

It should be noted that, according to the prior art, there are a variety of feasible implementation solutions for the three-axis motion platform 804; for example, the threading robot 9 is mounted on one XY axis motion platform, and the membrane wire transporting and fixing mechanism 807 is mounted one Z axis motion platform;

and for example, the threading robot 9 is directly mounted on one XYZ three-axis motion platform, etc. At the same time, there are a variety of feasible implementation solutions for the position identification system 805; for example, when the infrared position technology is adopted, the sensing terminal 10 is an infrared probe; and for example, when the image identification technology is adopted, the sensor terminal 10 is a camera, etc. Different changes will be produced in specific mounting locations of the sensing terminals 10 in according to different position identification technologies. As long as relevant functions can be achieved, these changed technical solutions should be regarded as derivatives of the technical solutions of the present invention and should all fall within the protection scope of the present invention.

Figure 6:
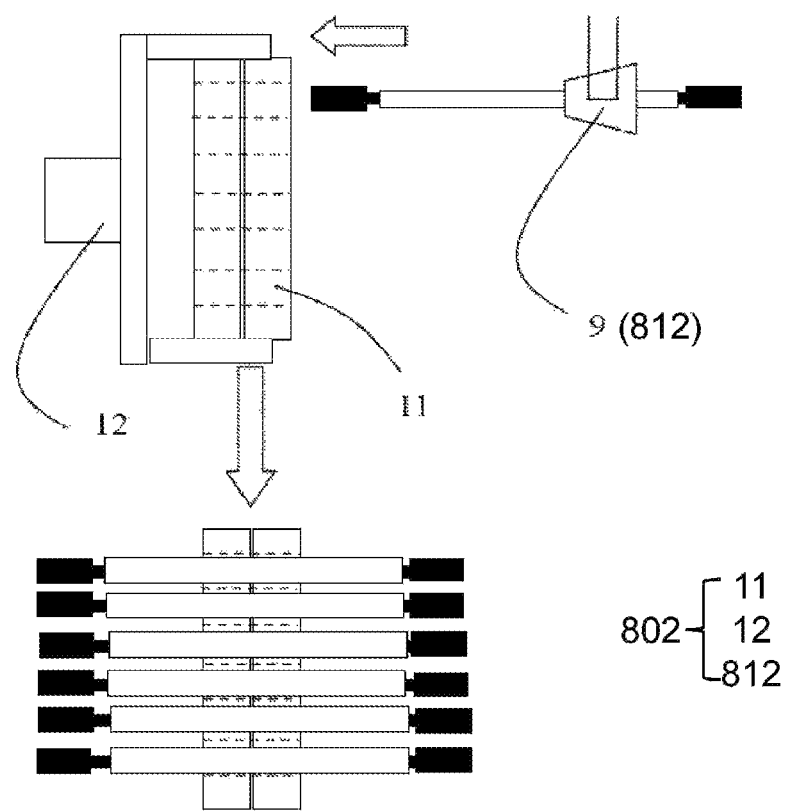
FIG. 6 is a schematic structural view of working process of a membrane wire filling module in embodiment 1.

Further, as shown in FIG. 6, the membrane wire filling module 802 comprises a hollow fiber membrane module holder 11, a fixing mechanism 12, and an insertion robot 812.

The hollow fiber membrane module holder 11 is provided with a plurality of voids which are regularly arranged and evenly distributed, for the insertion of the hollow fiber membrane wires. Specifically, the hollow fiber membrane module holder 11 is made of a plastic sheet, and regularly arranged holes are drilled by the laser drilling machine, such that the hollow fiber membrane module holder 11 is formed into a honeycomb. According to the specific form of the hollow fiber membrane module to be manufactured, the hollow fiber membrane module holder 11 may be in rectangular or round shape.

The insertion robot 812 is used for inserting the hollow fiber membrane wires into the holes of the hollow fiber membrane module holder.

The fixing mechanism 12 is used for fixing the hollow fiber membrane module holder 11 when the insertion robot 812 is working.

In the present embodiment, in order to optimize the resource configuration and simplify the system structure, the threading robot 9 in the rigidization treatment module 801 is directly transferred to be used as an insertion robot 812. The threading robot 9 has both the hole position identification function and the griping function, and is fully capable of performing the work of the insertion robot 812, avoiding a repeated design of the mechanical structure. The position identification function and the moving function of the insertion robot 812 can also be achieved by the three-axis motion platform 804 and the position identification system 805 in the rigidization treatment module 801, which will not be described here again.

Figure 7:
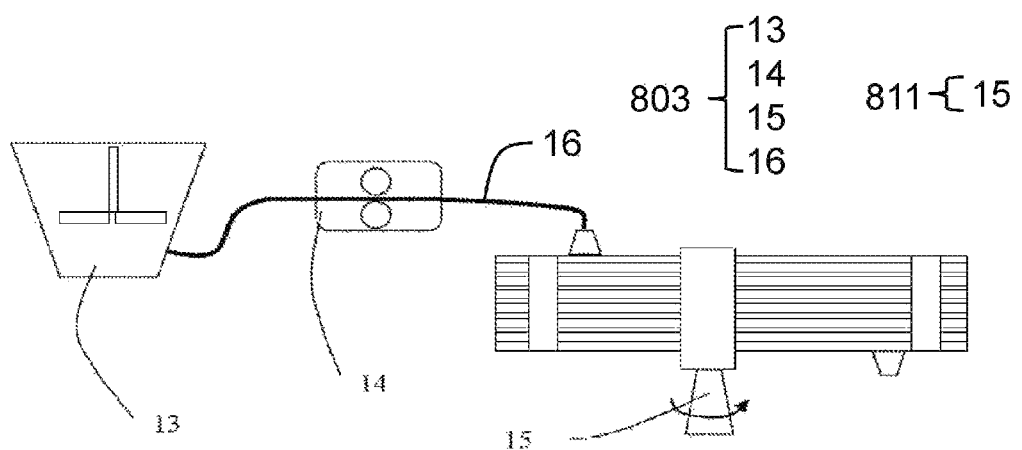
FIG. 7 is a schematic structural view of a potting and encapsulating module in embodiment 1.

Further, as shown in FIG. 7, the potting and encapsulating module 803 includes a glue mixer 13, a peristaltic pump 14, a delivery tube 16, and a centrifuge 15. The glue mixer 13 is connected to the casing of the hollow fiber membrane module via the delivery tube 16, and the peristaltic pump 14 is mounted on the delivery tube 16. The casing of the hollow fiber membrane module is mounted on the centrifuge 15. After the hollow fiber membrane module holder 11 filled with the hollow fiber membrane wires is mounted into the prefabricated casing of the hollow fiber membrane module, the casing of the hollow fiber membrane module is manually mounted into the centrifuge 15, and a resin glue mixed by the glue mixer 13 is delivered into both ends of the casing via the peristaltic pump 14 and the delivery tube 16. The centrifuge 15 is activated to distribute the glue evenly around the hollow fiber membrane wires.

Further, the steel wire removal module 811 comprises a heating mechanism and a removal mechanism.

The heating mechanism is used for heating the solid paraffin at both ends of the hollow fiber membrane wires after the sealant is dried, to release the relative fixing relationship between the steel wires and the hollow fiber membrane wires.

The removal mechanism is used for removing the steel wires from the hollow fiber membrane wires. In the present embodiment, the steel wires are directly flicked out of the hollow fiber membrane wires by the centrifuge 15, and the flicked steel wires can be reused in the rigidization treatment module 801.

In the present embodiment, movements of all the mechanisms can be controlled by computer automation to achieve the automated production of high-quality hollow fiber membrane modules; the membrane module produced by using the device of the present embodiment has the characteristic of even arrangement of internal membrane wires, and the hollow fiber membrane wires are rigidized. Therefore, the deformation and damage of the steel wires caused by the potting process is greatly reduced. The present embodiment is suitable for producing various forms of membrane modules and can be widely used for production of membrane modules for seawater desalination, membrane modules for dialysis, membrane modules for dehumidification, and the like.

Embodiment 2

The present embodiment provides a method for manufacturing a hollow fiber membrane module, and in particular, provides a method for manufacturing a hollow fiber membrane module using the device described in embodiment 1, which comprises the following steps:

S01: cutting and screening membrane wires: cutting and screening out hollow fiber membrane wires with a desired diameter and length.

S10: performing rigidization treatment to the membrane wires: penetrating steel wires having a length greater than that of a hollow fiber membrane wires into the hollow fiber membrane wires, and relatively fixing the steel wires and the hollow fiber membrane wires such that the hollow fiber membrane wires are rigidized;

S20: filling the membrane wires: a plurality of hollow fiber membrane wires to which rigidization treatment have been performed are filled into a hollow fiber membrane module holder;

S30: mounting, potting and encapsulating: the hollow fiber membrane module holder filled with the hollow fiber membrane wires is mounted into a casing of the hollow fiber membrane module, and a sealant is poured into the casing to encapsulate the casing; and S40: removing the steel wires: the relative fixing structure of the steel wires and the hollow fiber membrane wires are released after the sealant is dried, and the steel wires are removed from the hollow fiber membrane wires.

Further, the relatively fixing treatment in the step S10 is: using a molten paraffin to block two ports of the hollow fiber membrane wire segments and leaving the molten paraffin to be solidified, so as to fix the steel wires and hollow fiber membrane wire segments.

Further, the method for removing the steel wires from the hollow fiber membrane wire segments in the step S40 is: using a centrifuge to flick the steel wires out of the hollow fiber membrane wire segments and to manually pull the steel wires out of the hollow fiber membrane wire segments.

Regarding how to use the producing method of the present embodiment using the device provided in embodiment 1, it has been specifically described in embodiment 1, and will not be described here again.

The above-described embodiments just express several implementations of the present invention, and the description thereof is relatively specific and detailed, but it should not be understood as a limitation to the scope of the present invention. It should be noted that, for those skilled in the art, several variations and improvements may be made without departing from the concept of the present invention, and these are all within the protection scope of the present invention. Therefore, the scope of protection of the present invention shall be subject to the appended claims.

What is claimed:

1. A device for manufacturing a hollow fiber membrane module, the device comprises:

a plurality of steel wires and hollow fiber membrane wires;

a rigidization treatment module, used for penetrating the steel wires into hollow fiber membrane wire segments and fixing the steel wires and the hollow fiber membrane wire segments;

a membrane wire filling module, comprising a hollow fiber membrane module holder and a plurality of holes provided on the hollow fiber membrane module holder, wherein the membrane wire filling module is used for orderly filling the hollow fiber membrane wire segmentsto which rigidization treatment have been performed into accommodating grooves in the hollow fiber membrane module holder; and a potting and encapsulating module, comprising a glue mixer, a peristaltic pump, a delivery tube, and a centrifuge, wherein the potting and encapsulating module is used for mounting the hollow fiber membrane module holder filled with the hollow fiber membrane wire segments into a casing of the hollow fiber membrane module, and potting and encapsulating the casing, wherein:

the rigidization treatment module comprises a three-axis motion platform, a membrane wire transporting and fixing mechanism which is mounted on the three-axis motion platform, a steel wire gripping mechanism, a head mechanism, and a position identification system which is connected with a motion control circuit of the three-axis motion platform; the position identification system comprising one or more sensing terminals, and the one or more sensing terminals being mounted on the membrane wire transporting and fixing mechanism, the steel wire gripping mechanism and/or the head mechanism;

the membrane wire transporting and fixing mechanism being used for transporting and fixing the hollow fiber membrane wire segments, and the membrane wire transporting and fixing mechanism comprising a storage hopper and a transporting groove connected to a lower side of the storage hopper;

the steel wire gripping mechanism comprising a threading robot and being used for gripping and fixing the steel wires;

the head mechanism comprising a paraffin mold cavity and a wax injection tube which are communicated with each other, the wax injection tube being used for injecting molten paraffin into the paraffin mold cavity, and the paraffin mold cavity being used for covering two ports of the hollow fiber membrane wire segments to fix the hollow fiber membrane wires and steel wires;

the position identification system being used for sensing the relative location of the membrane wire transporting and fixing mechanism of the steel wire gripping mechanism and of the head mechanism in a three-dimensional space; and the three-axis motion platform being used in combination with the position identification system, for aligning the steel wires on the threading robot with the hollow fiber membrane wire segments on the membrane wire transporting and fixing mechanism, and penetrating the steel wires into the hollow fiber membrane wire segments, and also being used in combination with the position identification system, for moving the paraffin mold cavity of the head mechanism to the two ports of the hollow fiber membrane wire segments.

2. The device for manufacturing the hollow fiber membrane module according to claim 1, wherein the steel wire gripping mechanism and the head mechanism are integrally provided on the threading robot; the threading robot comprising two mold sections and a semi-cylindrical gripping groove body and a semi-cylindrical mold cavity groove body being provided at the middle of the mold sections, and the gripping groove body and the mold cavity groove body being coaxially arranged and communicated with each other; a diameter of the gripping groove body being matched with a diameter of the steel wires, and a diameter of the mold cavity groove body being larger than the diameter of the gripping groove body; the gripping groove bodies of the two mold sections jointly forming the paraffin mold cavity when the two mold sections are closed, and a wax injection tube being provided in one of the mold sections.

3. The device for manufacturing the hollow fiber membrane module according to claim 1, wherein the storage hopper has a cross section of in the form of a cone of which has an upper part that is larger than a lower part, and its bottom being provided with an opening; wherein the transporting groove is connected to the lower side of the storage; both ends of the bottom of the transporting groove are provided with openings; the bottom of the transporting groove being provided with a notch and a cover plate which is electrically controlled to open and close.

4. The device for manufacturing the hollow fiber membrane module according to claim 1, wherein the device further comprises a steel wire removal module to release the fixing relationship between the steel wires and the hollow fiber membrane wires; wherein the steel wire removal module comprises a centrifuge to remove the steel wires from the hollow fiber membrane wires.

5. The device for manufacturing the hollow fiber membrane module according to claim 1, wherein the membrane wire filling module further comprises: an insertion robot used for inserting the hollow fiber membrane wires into the holes of the hollow fiber membrane module holder.

* * * * *